May 26, 1925.
S. O. KELLY
TAG HOLDER
Filed Nov. 8, 1924
1,539,744
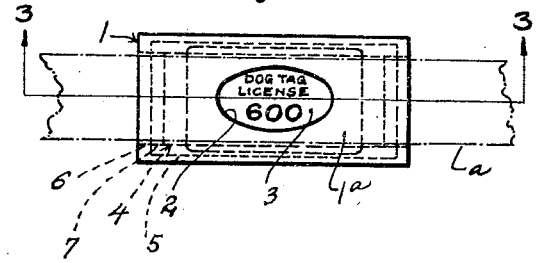
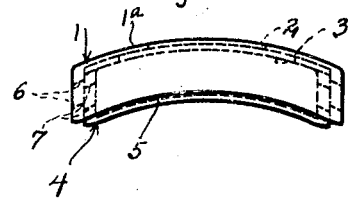
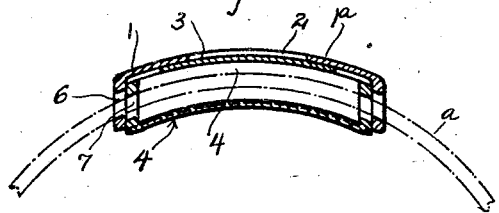
S. O. KELLY. INVENTOR
BY *Victor J. Evans*
ATTORNEY Patented May 26, 1925.

1,539,744

UNITED STATES PATENT OFFICE.

SAMUEL O. KELLY, OF WAMPUM, PENNSYLVANIA.

TAG HOLDER.

Application filed November 8, 1924. Serial No. 748,697.

*To all whom it may concern:*

Be it known that I, SAMUEL O. KELLY, a citizen of the United States, residing at Wampum, in the county of Lawrence and State of Pennsylvania, have invented new and useful Improvements in Tag Holders, of which the following is a specification.

This invention relates to holding devices, and more particularly to what I term a tag holder.

One of the main objects of the invention is to provide a device of simple and inexpensive construction by means of which license tags may be readily attached to dog collars and other devices of a similar nature. A further object is to provide a holding device which can be quickly and easily applied to a collar and which will act to effectively hold the license tag. Further objects will appear from the detail description.

In the drawings:—

Figure 1 is a top plan view of the device;

Figure 2 is a side view;

Figure 3 is a section taken substantially on line 3—3 of Fig. 2.

The device includes a box-like casing 1 provided with an opening 2 through its top wall for displaying a license plate 3 held adjacent the top wall of the casing. An inner member 4 constructed similarly to casing 1 and reversely related thereto fits snugly within the casing, the lateral flanges 5 of this inner member extending to within a short distance of top wall 1ª of casing 1. Casing 1 and inner member 2 are provided in their end walls with slots 6 and 7, respectively, adapted for reception of a strap *a* of a dog collar. The strap serves to hold casing 1 and member 4 together so as to hold license plate 3 in such position as to be readily viewed through opening 2. As will be noted from Figures 2 and 3, casing 1 and member 4 are arched or curved longitudinally so that the outer face of the bottom wall of member 4 will conform approximately to the curvature or round of the neck of a dog so as to be comfortable and avoid rubbing or irritation of the neck. This device can be readily produced and applied at very small cost and presents a neat appearance while providing simple and efficient means whereby the license plate is held in proper position to be readily viewed.

What I claim is:—

1. In a device of the character described, an outer casing having a display opening through its top wall, and an inner member fitting into said casing and having lateral flanges for confining between the same and the top wall of the casing a license plate, the casing and the inner member being provided at their ends with registering openings for reception of a collar strap.

2. In a device of the character described, an outer casing having a display opening through its top wall, and an inner member fitting into said casing and having upwardly projecting lateral flanges of approximately the same height as the lateral walls of the casing, said member and the casing having registering slots through their ends.

3. In a device of the character described, an outer casing having a display opening through its top wall, said casing being arched longitudinally, and an inner member fitting into said casing and curved similarly thereto, said inner member having upwardly projecting lateral flanges and the casing and the inner member having registering slots through their ends.

In testimony whereof I affix my signature.

SAMUEL O. KELLY.